US008459929B2

(12) United States Patent
Pillard et al.

(10) Patent No.: US 8,459,929 B2
(45) Date of Patent: Jun. 11, 2013

(54) HIGH-CAPACITY AUTOMATIC LOADER DEVICE

(75) Inventors: Romain Pillard, Avon (FR); Etienne Roudaut, Paris (FR)

(73) Assignee: Neopost Technologies, Bagneux (FR)

(*) Notice: Subject to any disclaimer, the term of this patent is extended or adjusted under 35 U.S.C. 154(b) by 339 days.

(21) Appl. No.: 12/825,900

(22) Filed: Jun. 29, 2010

(65) Prior Publication Data

US 2011/0002768 A1 Jan. 6, 2011

(30) Foreign Application Priority Data

Jul. 3, 2009 (FR) ...................................... 09 54580

(51) Int. Cl.
*B31B 1/00* (2006.01)
*B31B 1/92* (2006.01)

(52) U.S. Cl.
USPC ...................................... 414/795.8; 221/745

(58) Field of Classification Search
USPC ................ 198/465.3, 626.1, 773, 774.1, 775,
198/777, 793, 798, 817, 867.01; 211/49.1,
211/50, 59.4, 107–109, 75, 91; 414/156,
414/331.02, 331.04, 793.4, 793.7, 793.9,
414/794.2, 797.4, 798, 276; 493/126; 193/27;
221/108, 75; 312/42
See application file for complete search history.

(56) References Cited

U.S. PATENT DOCUMENTS

| | | | | | |
|---|---|---|---|---|---|
| 2,325,889 | A | * | 8/1943 | Thompson | 414/609 |
| 2,620,918 | A | * | 12/1952 | Fallon | 198/777 |
| 2,958,431 | A | * | 11/1960 | Curtenius | 414/793.8 |
| 2,987,219 | A | * | 6/1961 | Matteson | 221/75 |
| 3,126,123 | A | * | 3/1964 | Pickering | 221/75 |
| 3,355,065 | A | * | 11/1967 | Moe | 221/90 |
| 4,779,499 | A | * | 10/1988 | Yokokawa | 83/92 |
| 5,779,094 | A | * | 7/1998 | Stingel, Jr. | 221/75 |
| 5,787,776 | A | * | 8/1998 | Nishimoto | 83/76.7 |
| 5,921,690 | A | * | 7/1999 | Shinmachi et al. | 400/625 |
| 6,742,949 | B2 | * | 6/2004 | Youn | 400/647.1 |
| 2008/0119341 | A1 | | 5/2008 | Monti | |
| 2008/0122159 | A1 | | 5/2008 | Pillard | |
| 2009/0110458 | A1 | | 4/2009 | Sato | |
| 2011/0002768 | A1 | * | 1/2011 | Pillard et al. | 414/796.1 |

FOREIGN PATENT DOCUMENTS

| | | |
|---|---|---|
| EP | 1 923 340 A1 | 5/2008 |
| FR | 2 806 396 A1 | 9/2001 |
| GB | 2397285 A * | 7/2004 |
| JP | 61-51418 A | 3/1986 |

* cited by examiner

Primary Examiner — Gregory Adams
(74) Attorney, Agent, or Firm — Sughrue Mion, PLLC

(57) ABSTRACT

A mailpiece loader device comprising a storage tower for receiving mailpieces and whose mailpieces are separated into a plurality of independent stacks that are superposed one above another and that are held by a plurality of paddles, control means being provided for successively releasing, by gravity, each of said independent stacks separated in this way, it being possible for each paddle to retract horizontally from a support position to a retracted position under the action of rotation of a toothed wheel to which said paddle is connected via a mechanism of the crank and connecting rod type, said retracted position making it possible for said stack of mailpieces to be released by gravity.

7 Claims, 3 Drawing Sheets

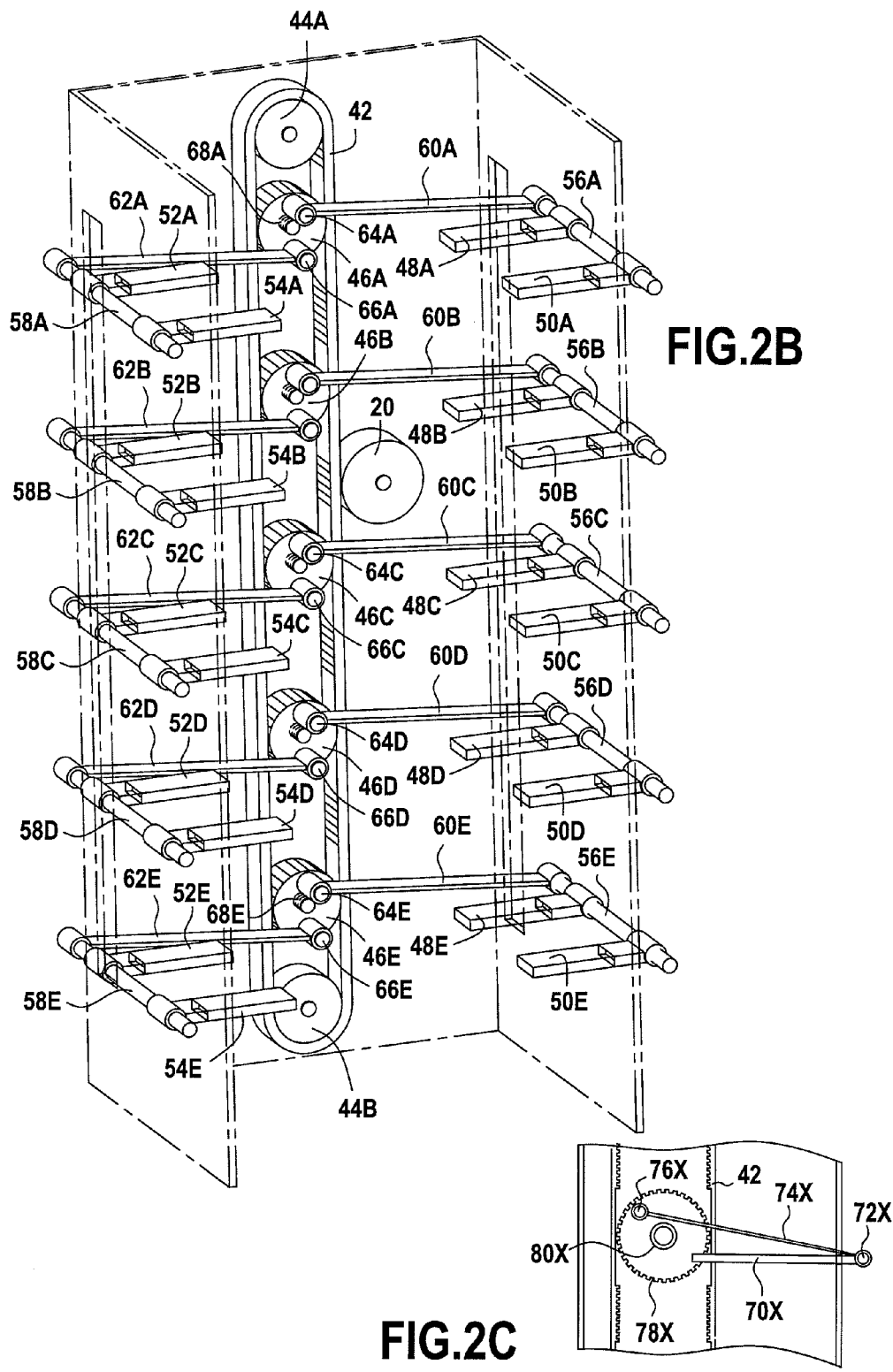

HIGH-CAPACITY AUTOMATIC LOADER DEVICE

FIELD OF THE INVENTION

The present invention relates to the field of mail handling, and it relates more particularly to an envelope loader device for a mail-handling machine, which device makes it possible to feed said machine with a large number of mailpieces.

PRIOR ART

A mail-handling machine is conventionally made up of three main elements: a mailpiece feeder; a "postage meter" or franking station for franking the mailpieces, which station is disposed at the outlet of the feeder (which can optionally incorporate a weigh device); and, disposed at the outlet of the franking station, a device for receiving the mailpieces once they have been franked by the franking station.

Current machines can frank mixed mail, i.e. mailpieces of all weights and formats, such mailpieces being stored flat in the magazine of the feeder in a small-capacity stack (about 200 envelopes of medium thickness) so as to be franked on being individually extracted by the unstacking and selection means of the feeder. Such a small capacity, which is made necessary by said unstacking and selection means, limits the productivity actually achieved by the machine because it requires frequent action from the operator for loading the mailpieces into the feeder. By way of example, in order to obtain a franking throughput of 15,000 envelopes per hour, it would be necessary to refill the magazine of the feeder 75 times per hour, which, in practice, leaves the operator very little time for performing the other actions (unloading the envelopes, putting them into mail bins per format, etc.) also required in operating the mail handling machine.

The height of the stack could be increased in order to increase the handling capacity. Unfortunately, since the weight of the stack would then increase proportionally, and in order to prevent mailpieces going through bunched together instead of singly, the friction force exerted by the extraction rollers and necessary for extracting an envelope at the bottom of said stack would have to be variable, i.e. firstly high when the stack is tall, and then decreasing as the height of the stack decreases, which would require a more powerful motor drive, a more robust drive mechanism, and more complex control electronics, all that being extremely costly.

The Applicant's Application EP 1 923 340 also proposes an envelope loader device that can receive a tall stack of mailpieces, successive fractions of which stack are caused to be ejected through a guillotine door of the device by control means as a function of a mail presence sensor mounted on the loader device itself and whose state depends on whether or not mailpieces are present in the feeder placed downstream from the loader device. Although that device is generally satisfactory, it still suffers from some drawbacks related firstly to the guillotine wall with which it is provided that sometimes generates jams, and therefore limits the franking throughput rate actually achieved, and secondly to the floor area or "footprint" occupied by the mail-handling machine due to the additional presence of that device upstream from the feeder. There therefore currently still exists an unsatisfied need for an improved loader device that makes it possible to guarantee an actually achievable franking throughput rate of 15,000 envelopes per hour and higher.

OBJECT AND DEFINITION OF THE INVENTION

An object of the present invention is to provide a loader device that has a feed capacity that is considerably higher than the feed capacity of a standard feeder magazine, and that mitigates the above-mentioned drawbacks.

These objects are achieved by a flat-article loader device comprising a storage tower for receiving flat articles, wherein the flat articles are separated into a plurality of independent stacks that are superposed one above another and that are held by a plurality of support means, control means being provided for successively releasing, by gravity, each of said independent stacks separated in this way, said support means comprising a paddle disposed on one of the sides of said stack of flat articles, it being possible for said paddle to retract horizontally from a support position to a retracted position under the action of rotation of a toothed wheel to which said paddle is connected via a mechanism of the crank and connecting rod type, said retracted position making it possible for said stack of flat articles to be released by gravity.

Preferably, said flat articles are mailpieces, and the loader device is disposed above a mail-receiving bed of a feeder of a mail-handling machine.

Thus, with this configuration, the footprint of the mail-handling machine is unchanged, and the successive releases of the sets of mailpieces that are dimensioned on the basis of the capacity of the feeder makes it possible to feed the feeder automatically without any risk of jamming, and thus without any break in the franking throughput rate.

In the embodiment considered, said support means may comprise a paddle disposed on one of the sides of said stack of flat articles, it being possible for said paddle to retract horizontally from a support position to a retracted position, said retracted position making it possible for said stack of flat articles to be released by gravity, or indeed at least two paddles (and advantageously four paddles) disposed on either side of said stack of flat articles, it being possible for said paddles to retract horizontally from a support position to a retracted position, said retracted position making it possible for said stack of flat articles to be released by gravity.

Advantageously, said toothed wheel is caused to move in rotation by said control means, via a motor-driven belt, as a function of the state of a mail presence sensor on a mail-receiving bed of said feeder.

Preferably, said sensor is chosen from among detectors of the mechanical, magnetic, or optical type.

Advantageously, said released stack of mailpieces has a thickness defined by the maximum feed capacity of said feeder.

BRIEF DESCRIPTION OF THE DRAWINGS

The characteristics and advantages of the present invention appear more clearly from the following description given by way of non-limiting example, with reference to the accompanying drawings, in which:

FIGS. 2A and 2B show two embodiments of the envelope loader device of FIG. 1;

FIG. 2C shows a variant embodiment of the device of FIG. 2B;

DETAILED DESCRIPTION OF A PREFERRED EMBODIMENT

Figure 1:
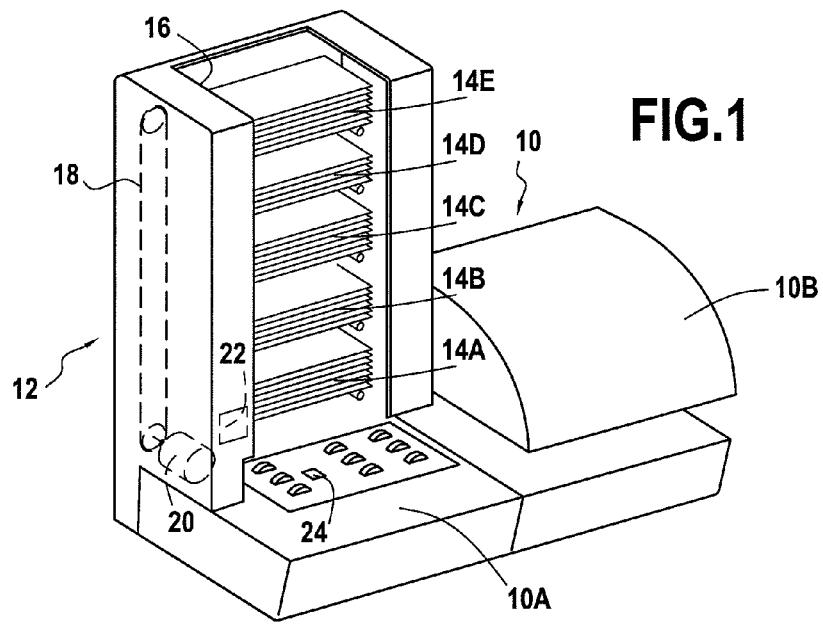
FIG. 1 is an outside perspective view of a feeder for a mail-handling machine, which feeder is associated with an envelope loader device of the invention.

FIG. 1 is a perspective view of a high-capacity mailpiece loader device of the invention that is designed to co-operate with a feeder of a mail-handling machine.

This mailpiece feeder 10 conventionally comprises a bed 10A for receiving the mailpieces, and unstacking and selection means 10B for selecting, one after another, the mailpieces stacked on said bed. In order to enable the stack of mailpieces disposed on the mail-receiving bed to be managed correctly, i.e. in order to guarantee that unstacking takes place without jamming and without more than one mailpiece being selected at a time, the loading capacity of such a feeder is typically limited to a stack height of about 200 millimeters (mm), which, in practice, corresponds to a loading capacity of about 200 envelopes of standard European format, each of which contains one sheet of paper of A4 format.

In the invention, this capacity is increased considerably by adding, above the mail-receiving bed 10A of the feeder, a loader device 12 that is in the form of a storage tower 14 provided with a plurality of superposed individual compartments 14A, 14B, 14C, 14D, 14E, each of which is designed to receive and to hold in position a stack of mailpieces that has a height (and thus a number of envelopes) that corresponds at the most and preferably to the maximum loading capacity of the feeder on which it is to be mounted. Each of the stacks is separated from the adjacent stacks so as to make it possible to deposit the mailpieces stack-by-stack on the mail-receiving bed of the feeder, and a loading opening 16 is provided that may be a front opening or a top opening as shown. The loader device is secured to the feeder by mechanical coupling means (not shown), and an electrical connector (see reference 29 in FIG. 2A) is provided for transfer of monitoring/control information with the feeder. The loader device also has a conveying and ejection system 18, advantageously of the type having cogs and toothed belts, which system is motor-driven by a drive motor 20 so as to release the stacks of mail contained by the storage tower successively therefrom. The drive motor is actuated by a processing module 22 depending on the state of a mail presence sensor 24, of the mechanical, magnetic, or preferably optical type disposed at the mail-receiving deck 10A of the feeder, and whose state is communicated to the loader device via the electrical connector.

Figure 2A:
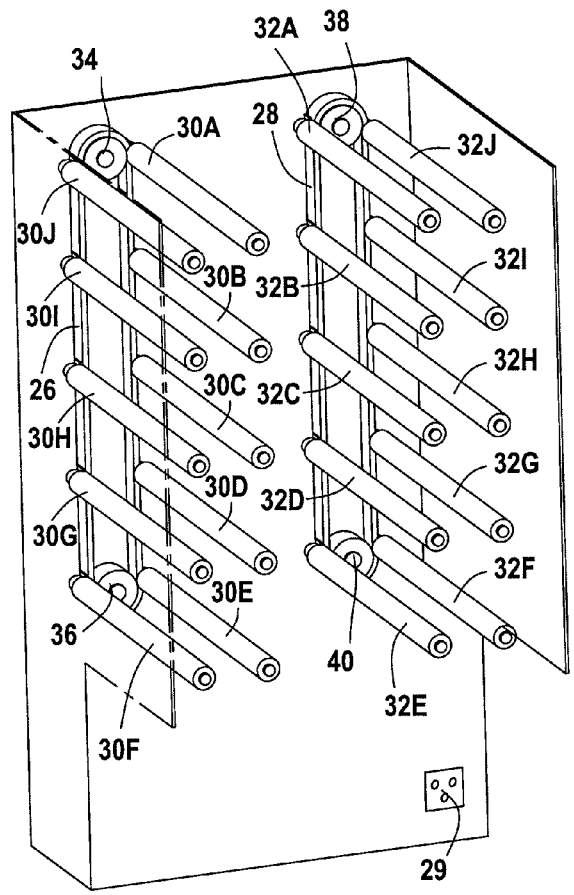

By way of information, FIG. 2A shows a non-claimed embodiment of the loader device of the invention, in which the various stacks of mailpieces are supported by support bars mounted on two motor-driven chains 26, 28 disposed on either side of said stack. More precisely, in the example shown, ten support bars 30A-30J; 32A-32J are fastened to each chain in a cantilevered-out position, which bars are distributed uniformly over said chain such that each of five of them 30A-30E; 32A-32E supports a respective stack of mailpieces while the other five support bars 30E-30J; 32F-32J are in the rest position. Each chain is held tensioned between two cogs 34, 36; 38, 40, at least one of which drives the chain directly between a high position and a low position. Preferably, all of the chains are driven simultaneously from a single drive cog 36. The five support bars define five levels on which five stacks of mailpieces can rest, the gap between two superposed support bars defining the maximum allowable height for a stack. The various stacks are then loaded from the front merely by depositing each stack on its corresponding two support bars.

It should be noted that although reference is made essentially to using a single drive chain 26 or 28 per side, it is naturally also possible to use two parallel chains for each side of the stack of mailpieces, between which chains the support bars are held, or indeed any other analogous device making it possible to convey the stacks and then to release them by gravity stack-by-stack. However, when the support bars are held between two parallel chains, then, due to the presence of the second chain, loading cannot be performed from the front and must therefore be performed from the top. In which case, once the first stack has been put in place on the two opposite support bars 30A, 32J, the motor must be actuated to drive the chains in rotation so as to take the first stack down a level so that the second stack can be placed in the storage tower, and so on until the fifth stack is put in place. The motor can be caused to be actuated from the feeder via an electrical connector 29 or directly at the loading device (this alternative is not shown). Naturally, the configuration shown is in no way limiting, the number of levels being limited only by considerations of access, and in particular of compactness in the height direction.

FIG. 2B shows a preferred embodiment of the loader device of the invention, in which the various stacks of mailpieces are not supported by support bars moving vertically and mounted on two sets of motor-driven chains disposed on either side of the stack, but rather they are supported by support paddles or fingers disposed on either side of said stack and mounted to move horizontally via a crank and connecting rod mechanisms driven by toothed wheels themselves pivoted by a single belt. More precisely, a belt 42 held tensioned between two idler wheels 44A, 44B is driven directly in rotation by the drive motor 20. Its inside face is partially covered in separate runs of crenellations so as to co-operate with a plurality of toothed wheels 46A, 46B, 46C, 46D, 46E that, on moving in rotation cause pairs of paddles 48A-48E, 50A-50E; 52B-52E, 54B-54E to retract or to be deployed. Each pair of paddles is connected via a perpendicular pin 56A-56B; 58A-58E to one end of a connecting rod 60A-60E; 62A-62E whose other end is secured to an offset hinge pin 64A-64E; 66A-66E that is offset relative to the central axle of the toothed wheel on which axle a spiral return spring 68A-68E is mounted. So long as the belt is in engagement with a toothed wheel, the associated paddles retract into their housings, into a retracted position, releasing the corresponding stack, and when the crenellated run of the belt goes beyond the wheel, said wheel ceases to be driven since it is not driven by the non-crenellated run of the belt, thereby causing the paddles to be deployed, into their support position, under drive from the return spring mounted on the axle of each of the toothed wheels 46A-46E. As above, the drive motor 20 is caused to actuate the paddles from the feeder via the electrical connector 29.

Naturally, it is not essential to use a pair of paddles disposed on each of the two transverse sides in order to support the stack, it being possible for a single paddle disposed on either side to be suitable subject to it having a width that is sufficient relative to the widths of the mailpieces to be loaded (typically approximately in the range ⅓ to ⅔ of said width). Similarly, as shown in the variant shown in FIG. 2C, subject to the single paddle being of size sufficient relative to the stack of mailpieces that it supports (at least one half the size of the stack), it is possible to have only one crank and connecting rod mechanism per level, with a paddle 70X mounted on its pin 72X at one end of the connecting rod 74X whose other end is hinged to the offset pin 76X on the toothed wheel 78X driven by the partially crenellated belt 42 and whose axle embodying its axis of rotation is provided with a spiral return spring 80X.

Operation of the loader device of the invention is explained below with reference to FIGS. 3A to 4D.

Figure 3A:
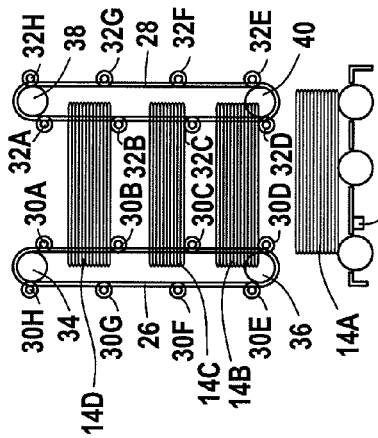
FIGS. 3A to 3D show various operating positions of the non-claimed embodiment of the envelope loader device shown in FIG. 2A.

FIG. 3A shows the initial position of the non-claimed embodiment of the loader device and the initial position of the mail-handling machine, only the mail-receiving bed of which is shown, prior to being switched on. In this position, the storage tower of the loader device and the mail-receiving bed of the feeder of said mail-handling machine have both been loaded by the operator with their respective stacks of envelopes. Typically, a stack of about 200 envelopes is disposed on the mail-receiving bed 10A of the feeder and advantageously three stacks of about 200 envelopes each are disposed in the storage tower 14 of the loader device, thus forming a set of 600 envelopes. In this initial position, the drive motor 20 of the loader device is at rest, and the envelopes are therefore stationary. The mail presence sensor 24 in the feeder is in a "high" initial state indicating that envelopes are present on the mail-receiving bed 10A of the feeder.

Figure 3B:
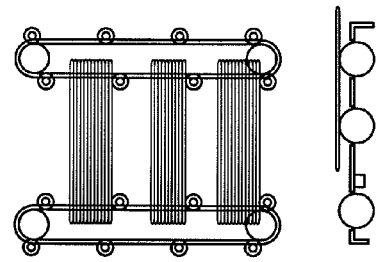

Switching on the mail handling machine causes the feeder to operate. The feeder then proceeds to unstack its stack of envelopes and to eject the envelopes one-by-one towards the franking station of said machine, so that, less than 50 seconds later (for a throughput rate of 15,000 envelopes per hour), the configuration shown in FIG. 3B is reached, in which the last few envelopes on the mail-receiving bed of the feeder are starting to be taken by the selector device and in which the mail presence sensor is then uncovered and goes to a "low" level, thereby indicating that the feeder will soon be empty and that it needs to be re-stocked.

Figure 3C:
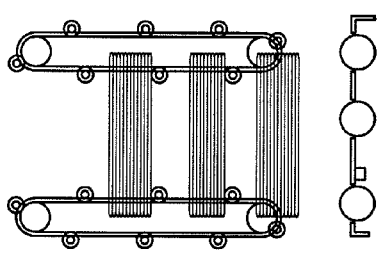
Figure 3D:
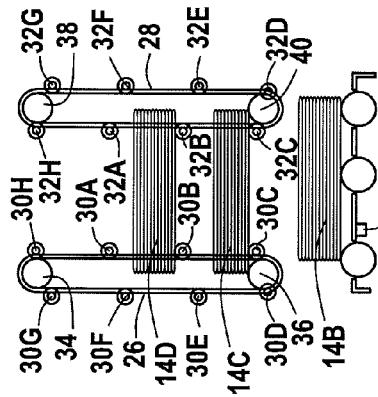

This re-stocking step is shown in FIGS. 3C and 3D. It corresponds to the drive motor 20 being switched on, thereby causing the conveyor chains to move simultaneously so as to release the first (the lowest) of the stacks of envelopes from the storage tower of the loader device, which stack is, in FIG. 3C, about to fall onto the mail-receiving bed of the feeder so as to replace the initial stack of envelopes that has been processed by the franking station of the mail-handling machine.

Once the stack of envelopes has been received by the feeder (see FIG. 3D), the mail-receiving bed finds itself in a position similar to the position of FIG. 3A, with one stack of envelopes fewer (the highest stack that has moved down a level at the same time as the first stack), the mail presence sensor going back to a "high" level due to the presence of the new envelopes, and the drive motor of the loader device then being switched off.

Figure 4A:
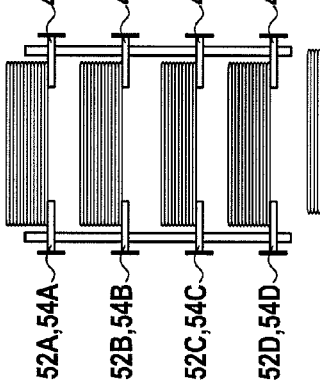
FIGS. 4A to 4D show various operating positions of the preferred embodiment of the envelope loader device of the invention shown in FIG. 2B.
Figure 4B:
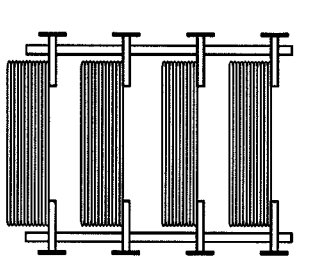

FIG. 4A shows the initial position of the preferred embodiment of the loader device of the invention and the initial position of the mail-handling machine (once again, only the mail-receiving bed of the mail-handling machine is shown), prior to being switched on. In this position, the storage tower of the loader device and the mail-receiving bed of the feeder of said mail-handling machine have both been loaded by the operator with their respective stacks of envelopes. Typically, a stack of about 200 envelopes is disposed on the mail-receiving bed 10A of the feeder and advantageously four stacks of about 200 envelopes each are disposed in the storage tower 14 of the loader device, thus forming a set of 800 envelopes. In this initial position, the drive motor 20 of the loader device is at rest, and the envelopes are therefore stationary. The mail presence sensor 24 in the feeder is in a "high" initial state indicating that envelopes are present on the mail-receiving bed 10A of the feeder.

Switching on the mail handling machine causes the feeder to operate. The feeder then proceeds to unstack its stack of envelopes and to eject the envelopes one-by-one towards the franking station of said machine, so that, less than 50 seconds later, as mentioned above, the configuration shown in FIG. 4B is reached, in which the last few envelopes on the mail-receiving bed of the feeder are starting to be taken by the selector device of the feeder and in which the mail presence sensor is then uncovered and goes to a "low" level, thereby indicating that the feeder will soon be empty and that it needs to be re-stocked.

Figure 4C:
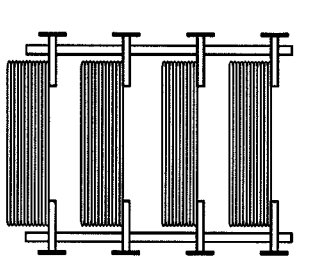
Figure 4D:
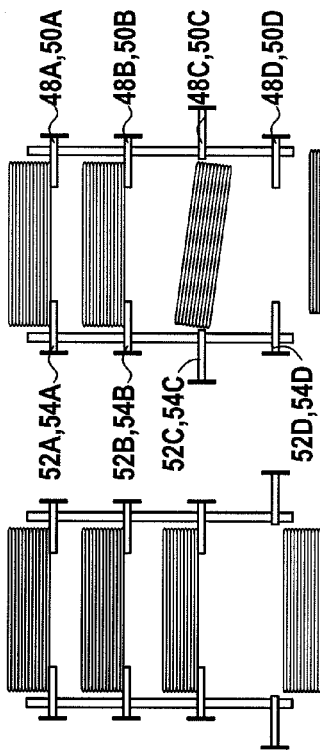

This re-stocking step is shown in FIGS. 4C and 4D. It corresponds to the drive motor 20 being switched on, thereby causing the first-level support paddles to move simultaneously so as to release the first (the lowest) of the stacks of envelopes from the storage tower of the loader device, which stack is thus about to fall by gravity onto the mail-receiving bed of the feeder (FIG. 4C) so as to replace the initial stack of envelopes that has been processed by the franking station of the mail-handling machine.

Once the stack of envelopes has been received by the feeder (see FIG. 4D), the mail presence sensor goes back to a "high" level due to the presence of the new envelopes, but, unlike in the first embodiment, the drive motor of the loader device is not then switched off because the mail-receiving device does not yet find itself in a position similar to the position of FIG. 4A, and the other support paddles must be caused to move level-after-level to reach this position (with one stack fewer, since the highest stack has moved down a level) while enabling the other stacks of envelopes to move down successively.

Thus, with the invention, the envelope feed capacity is increased. The ease of loading is particularly advantageous for the operator due to the small original capacity of the mail-receiving bed of the feeder, and to the total absence of jamming that such a device procures. In addition, the drive mechanism for moving the envelopes is simplified to the maximum extent, making it possible to implement a loader device that is robust and almost maintenance-free.

It should be noted that although the above description is made essentially with reference to a feeder for a mail-handling machine, the loader device of the invention is naturally also applicable to any other type of feeder (e.g. a feeder of flat articles such as documents). It should also be noted that the device may also be used at the outlet of a franking machine for receiving the ejected mailpieces (with top-loading), and for then unloading them in stacks into a postal bin disposed below the device.

What is claimed is:

1. A flat-article loader device comprising a storage tower for receiving flat articles, wherein the flat articles are separated into a plurality of independent stacks that are superposed one above another and that are held by a plurality of support means, control means being provided for successively releasing, by gravity, each of said independent stacks separated in this way, said support means comprising a paddle disposed on one of the sides of said stack of flat articles, it being possible for said paddle to retract horizontally from a support position to a retracted position under the action of rotation of a toothed wheel to which said paddle is connected via a mechanism of the crank and connecting rod type, said retracted position making it possible for said stack of flat articles to be released by gravity, and wherein said toothed wheel is caused to move in rotation by said control means, via a motor driven belt, as a function of the state of a presence sensor for sensing presence of the flat articles.

2. A device according to claim 1, wherein said support means comprise at least two paddles disposed on either side of said stack of flat articles, it being possible for said paddles to retract horizontally from a support position to a retracted position, said retracted position making it possible for said stack of flat articles to be released by gravity.

3. A device according to claim 2, having four paddles disposed on either side of said stack of flat articles.

4. A device according to claim 1, wherein said sensor is chosen from among detectors of the mechanical, magnetic, or optical type.

5. A device according to claim 1, wherein said flat articles are mailpieces.

6. A device according to claim 5 that is disposed above a mail-receiving bed of a feeder of a mail-handling machine.

7. A device according to claim 6, wherein said released stack of mailpieces has a thickness defined by the maximum feed capacity of said feeder.

* * * * *